Dec. 19, 1967   L. I. BERENS   3,358,648

METHOD AND APPARATUS FOR CRYOGENIC BRANDING

Filed May 26, 1967

INVENTOR.
LINUS I. BERENS
BY
*Robert E. Burns*

ATTORNEY

United States Patent Office 3,358,648
Patented Dec. 19, 1967

3,358,648
METHOD AND APPARATUS FOR CRYOGENIC BRANDING
Linus I. Berens, Rte. 7, Box 660,
Tallahassee, Fla. 32301
Filed May 26, 1967, Ser. No. 641,641
7 Claims. (Cl. 119—1)

ABSTRACT OF THE DISCLOSURE

A method of branding animals comprises providing shaped heat-conducting tubing having a portion formed to the shape of brand insignia to be applied to an animal, passing a cryogenic fluid through the tubing and controlling the admission and discharge of the fluid to cool the tubing to a selected sub-freezing temperature and pressing the cooled insignia-shaped tubing portion firmly against the hide of an animal to be branded to effect local controlled freezing of areas corresponding to the shape of the insignia. The cryogenic fluid may, e.g., be liquid nitrogen. Apparatus for carrying out the method comprises shaped heat-conducting tubing having a portion formed to the shape of the insignia to be applied, flexible heat insulated tubing connecting the shaped tubing to a supply of liquefied gas and means controlling the exhaust of gas from the shaped tubing to effect controlled cooling of the insignia-shaped tubing portion to sub-freezing temperature. Preferably the apparatus comprises a plurality of shaped tubings having portions formed to the shape of different insignia and quick disconnect coupling means so that the differently shaped tubings can be interchangeably coupled to the flexible tubing. The shaped tubing preferably also comprises a branched portion having branches connected at different points to the insignia-shaped portion and an exhaust portion leading from a further point of the insignia-shaped portion to the exhaust controlling means.

---

The present invention relates to applying brands to the hides of live animals and particularly to freeze-branding.

The branding of animals has heretofore traditionally been effected by means of a hot branding iron applied to the hide of an animal to burn off the hair and also burn the skin so as to form scar tissue in which the hair does not grow back. Branding by means of a hot branding iron is painful to the animal and is a laborous and distasteful job for the persons required to do the branding.

It has been proposed to brand animals with branding irons which have been cooled to an extremely low temperature instead of being heated. The branding irons used are like conventional solid metal irons except that they are preferably formed of copper or bronze instead of iron. They are cooled by being put in a container of Dry Ice and alcohol. The cold iron, when applied to the skin of an animal causes depigmentation of dark hair follicles resulting in regrowth of white hair in the shape of the brand design. Application of the iron to the skin for a longer period of time may cause permanent removal of the hair.

Experience with present freezed branding methods and apparatus has indicated that they are time consuming and cumbersome. The irons must be left in the Dry Ice-alcohol mixture for about half an hour before they are ready to use and must be recooled after each application so that the branding operation is slow. Moreover, the alcohol of the mixture in which the irons are immersed for cooling purposes drips or runs down the animal's hide so that the branding is a messy job.

The present invention is directed to an improved method of freeze branding and to apparatus for carrying out the method. In accordance with the invention, heat-conducting tubing, e.g., copper tubing, is bent or otherwise fashioned into the shape of the brand insignia that are to be applied. The tubing is cooled by passing a cryogenic fluid through it, the admission and discharge of the fluid being controlled to cool the tubing to a selected sub-freezing temperature. As the cooling is almost instantaneous, there is no waiting time before the apparatus can be used. Moreover, since the cooling of the tubing continues during application of the tubing to an animal, the apparatus can be used on a succession of animals without any waiting interval between them.

The nature and advantages of the method in accordance with the invention and the apparatus for carrying it out will appear more fully from the following description in conjunction with the accompanying drawings in which a preferred embodiment of the apparatus is shown by way of example. In the drawings FIG. 1 is a somewhat schematic side view of apparatus in accordance with the invention.

Figure 1:
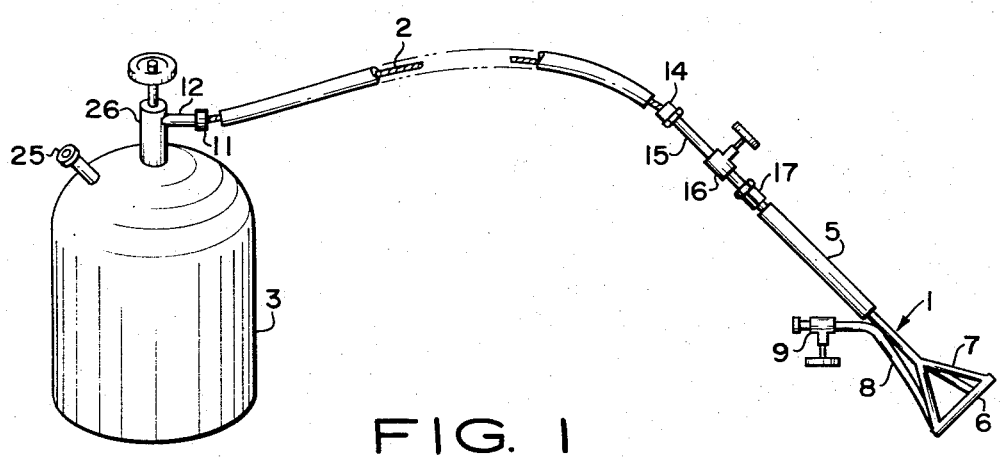
Figure 2:
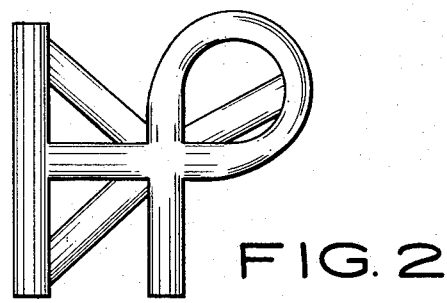
FIG. 2 is an end view of tubing shaped to provide the desired brand.
Figure 3:
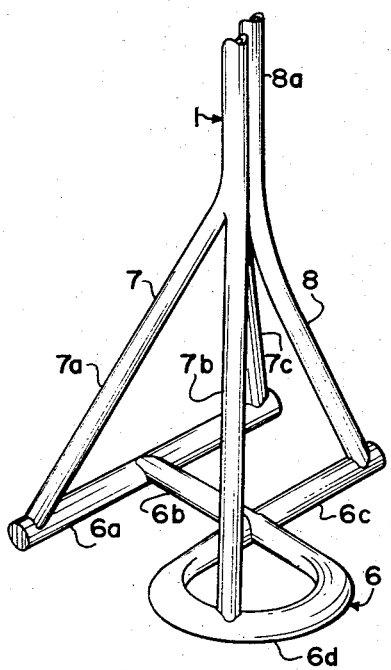
FIG. 3 is a top perspective view showing a portion of the shaped tubing.

The apparatus shown by way of example in the drawings comprises heat-conducting tubing 1 having a portion shaped to form desired brand insigna, insulated flexible tubing 2 connecting the shaped tubing to a supply of cryogenic fluid shown as a tank 3 of liquefied gas and suitable valve means for controlling admission of cryogenic fluid to and its discharge from, the shaped tubing 1.

The shaped tubing is formed of copper or other material having good heat-conducting characteristics. The tubing comprises a handle portion 5, an insignia-shaped portion 6, a branch portion 7 comprising branches 7a, 7b and 7c connecting the insignia shape portion 6 to the handle portion 5 and a discharge portion 8. The handle portion 1 is shown as being straight for convenience of holding the tubing and is preferably covered with suitable heat insulating material in order to insulate the tubing from the atmosphere and to insulate the hands of the operator from the tubing.

The shaped portion 6 of the tubing is fashioned, e.g., by suitable bending and welding or brazing of tubing sections to provide the shape of the brand which it is desired to apply. In the example illustrated in the drawings, the brand to be applied is P lazy H and the tubing accordingly comprises straight portion 6a, 6b, 6c and a curved portion 6d, all communicating with one another. The branched portion 7 of the tubing and the discharged portion 8 are connected with the shaped portion 6 in such manner as to provide suitable circulation of fluid through the tubing to cool all portions of the shaped tubing substantially uniformly. In the example illustrated in the drawings, branches 7a and 7c are connected to opposite ends of the straight portion 6a while branch 7b is connected approximately to the center of the curved portion 6d. The discharge tubing portion 8 is connected to the end of the straight tubing portion 6c. In addition to providing copper fluid distribution, the branched portion 7 and discharge portion 8 of the tubing also provide physical strength and suitable distribution of force when the shaped portion 6 is pressed against an animal by means of the handle portion 5. For purposes of physical strength, the discharge tubing portion 8 is preferably secured to the handle portion 1, e.g., by brazing as indicated at 8a. The branched portion 7 and discharge portion 8 of the tubing may also be covered with heat insulating material if desired. The shaped portion 6 is, of course, bare at least on the side that is to be applied to an animal.

The discharge line 8 is provided with suitable means for controlling the discharge of gas from the tubing. This is necessary in order to discharge air from the tubing when the apparatus is put into use and is also desirable to permit controlled discharge of vapor produced by the evaporation of liquefied gas supplied to cool the tubing. Discharge of gas from the tubing may, e.g., be controlled by an orifice of suitable size or by an automatic valve, e.g., a valve responsive to temperature or pressure. However, to provide for an adjustable and, at the same time, simple control, there is shown a valve 9 in the form of a needle valve or pet-cock which can be closed or can be opened to any selected degree.

The shaped tubing 1 is connected to a supply of cryogenic fluid by a supply line which is shown as comprising the flexible tubing 2 which at one end is connected by a coupling 11 to a nipple 12 on the supply tank 3. At the other end, the flexible tubing 2 is connected by a coupling 14 to a short length of tubing 15 containing a manually operable valve 16. The flexible tubing 2, nipple 12 and tubing 15 are preferably covered with suitable heat-insulating material. The shaped tubing 1 is connected to the tubing 15 by a quick disconnect coupling 17. When the apparatus is to be used to apply different brands—as is usually the case—a shaped tubing is provided for each of the brands. For example, in addition to the tubing shown by way of example in the drawing, there might be tubing formed in the shape of a circle and another tubing formed in the shape of a cross. The quick disconnect coupling 17 makes it possible to change brands easily and quickly. The valve 16 is closed when brands are being changed. As the cooling of the shaped tubing is almost instantaneous as soon as cryogenic fluid is applied to it, there is no substantial delay in changing from one brand to another.

Figure 4:
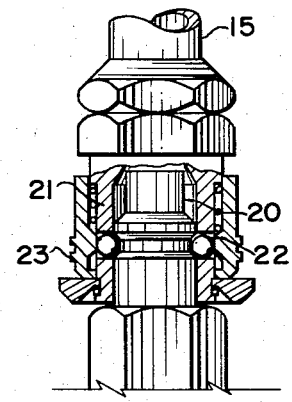
FIG. 4 is a side view partially in section of a quick disconnect coupling permitting use of the apparatus to apply different brands.

A suitable quick disconnect coupling is shown by way of example in FIG. 4. A male member 20 secured to the upper end of the handle portion 5 of the shaped tubing 1 is received in a socket 21 secured to the tube 15. The male member 20 is reasonably held in the socket 21 by a plurality of balls 22 which engage a peripheral groove in the male member 20 and are held in locking positions by a sleeve 23. The sleeve is slidable in an axial direction against spring bias to a position in which the balls 22 are permitted to move radially outwardly and thereby release the male member 20 from the socket.

A supply of cryogenic fluid for the apparatus is shown as comprising the tank 3 which is preferably a tank of liquefied gas, e.g., liquid nitrogen. The tank 3 is shown provided with a popoff valve 25 and with a manually controlled valve 26 provided with a nipple 12 to which the flexible tubing 2 is connected. The valve 26 is normally closed when the apparatus is not in use and is opened when it is desired to use the apparatus. The rate at which liquid nitrogen or other cryogenic fluid is supplied to the shaped tubing 1 is controlled by the supply valve 26 on the tank 3 or the valve 16 at the outer end of the flexible tubing 2. The rate of flow of fluid through the shaped tubing 1 when the apparatus is in use is also controllable by the discharge valve 9.

The manner in which branding apparatus in accordance with the present invention is used will be apparent from the foregoing description. With the shaped tubing 1 coupled by the flexible tubing 2 to the supply tank 3, the valves 26, 16 and 9 are adjusted to discharge air from the tubing and to permit controlled flow of liquid nitrogen or other cryogenic fluid through the tubing to cool the shaped portion 6 of the tubing 1 to the desired sub-freezing temperature. An operator holding the tubing 1 by the handle portion 5 presses the shaped portion 6 against the skin of the animal to be branded so as to produce local freezing of an area corresponding to the shape of the brand. The hair in the area where the brand is to be applied may have been previously clipped to provide better contact of the tubing with the skin. The local freezing causes a depigmentation of dark hair follicles which results in regrowth of white hair in the shape of the desired brand. Longer application of the cooled tubing may cause permanent removal of the hair without, however, causing hide damage. Since cooling of the shaped tubing by the cryogenic fluid continues while the brand is being applied, it is possible to brand one animal after another in rapid succession without any waiting time between. Moreover, if it is desired to apply different brands to different animals, this is readily done since the quick disconnect coupling 17 permits the quick interchange of tubing shaped to provide the brands desired.

While a preferred embodiment of apparatus in accordance with the invention has been illustrated in the drawings and is herein particularly described, it will be understood that the invention is in no way limited to this example and that modifications may be made within the scope of the appended claims.

What I claim is:

1. Means for applying a brand insignia to the hide of a live animal comprising shaped heat-conducting tubing having a portion formed to the shape of the insignia to be applied, flexible heat insulated tubing connecting said shaped tubing to a supply of liquefied cryogenic gas, means controlling the admission of said gas to said shaped tubing and means controlling the exhaust of said gas from said shaped tubing to effect controlled cooling of said insignia shaped tubing portion to sub-freezing temperature, said cooled insignia shaped tubing portion being applied to the hide of a living animal to effect local controlled freezing of areas corresponding to the shape of said insignia.

2. Branding means according to claim 1, further comprising quick-disconnect coupling means between said flexible tubing and said shaped tubing.

3. Branding means according to claim 2, comprising a plurality of said shaped tubings having portions formed to the shape of different insignia, said differently shaped tubings being interchangeably coupled to said flexbile tubing by said quick-disconnect coupling means.

4. Branding means according to claim 1, in which said shaped tubing comprises a branched portion having branches connected at different points to said insignia shaped portion and an exhaust portion leading from a further point of said insignia shaped portion to said exhaust controlling means.

5. A method of branding animals which comprises providing shaped heat-conducting tubing having a portion formed to the shape of brand insignia to be applied to an animal, passing a cryogenic fluid through said tubing and controlling the admission of said fluid to and discharge of said fluid from said tubing to cool said tubing to a selected sub-freezing temperature and pressing said cooled-insignia shaped tubing portion firmly against the hide of an animal to be branded to effect local controlled freezing of areas corresponding to the shape of said insignia.

6. A method of branding according to claim 5 in which said cryogenic fluid is admitted to said insignia shaped tubing portion at a plurality of spaced points and is discharged at a point spaced from said points of admission to effect substantially uniform cooling of said insignia shaped tubing portion.

7. A method of branding according to claim 5, in which sad cryogenic fluid is an evaporating liquefied gas.

References Cited

UNITED STATES PATENTS

| | | | |
|---|---|---|---|
| 896,454 | 8/1908 | Marsden | 158—15 |
| 1,101,616 | 6/1914 | Christiansen | 158—16 |
| 1,527,270 | 2/1925 | Peterson | 158—14 |
| 2,536,001 | 12/1950 | Chase | 62—293 |
| 2,645,097 | 7/1953 | Posch | 62—293 |
| 2,982,112 | 5/1961 | Keyes | 62—293 |
| 3,190,081 | 6/1965 | Pytryga | 128—303.1 |
| 3,259,131 | 7/1966 | Kanbar et al. | 128—303.1 |
| 3,272,203 | 9/1966 | Chato | 128—303.1 |

ALDRICH F. MEDBERY, *Primary Examiner.*